United States Patent
Yazawa et al.

(10) Patent No.: US 7,052,560 B2
(45) Date of Patent: May 30, 2006

(54) SOFT MAGNETIC FILM AND THIN FILM MAGNETIC HEAD USING THE SAME

(75) Inventors: Hisayuki Yazawa, Niigata-ken (JP); Yoshihiro Kanada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 170 days.

(21) Appl. No.: 10/659,118

(22) Filed: Sep. 10, 2003

(65) Prior Publication Data
US 2004/0051997 A1    Mar. 18, 2004

(30) Foreign Application Priority Data
Sep. 13, 2002    (JP) .............................. 2002-267729

(51) Int. Cl.
*H01F 1/04*    (2006.01)
(52) U.S. Cl. .................... 148/310; 360/126; 420/96
(58) Field of Classification Search .................. None
See application file for complete search history.

(56) References Cited

U.S. PATENT DOCUMENTS

| | | | | |
|---|---|---|---|---|
| 4,242,710 A | * | 12/1980 | Hempstead et al. | ......... 360/328 |
| 4,536,229 A | * | 8/1985 | Jin et al. | ..................... 148/310 |
| 5,935,346 A | * | 8/1999 | Couderchon et al. | ........ 148/108 |
| 6,183,881 B1 | | 2/2001 | Shimizu | |
| 6,262,867 B1 | | 7/2001 | Sano et al. | |
| 6,376,108 B1 | * | 4/2002 | Otagiri et al. | .............. 428/212 |
| 6,449,122 B1 | * | 9/2002 | Yazawa et al. | ............. 360/126 |
| 2002/0154444 A1 | * | 10/2002 | Sano et al. | ................. 360/126 |

FOREIGN PATENT DOCUMENTS

| | | | |
|---|---|---|---|
| JP | 63-100148 | * | 2/1988 |
| JP | 8-212512 | | 8/1996 |
| JP | 9-63016 | | 3/1997 |
| JP | 2000-58364 | | 2/2000 |
| JP | 2000-235911 | | 8/2000 |

* cited by examiner

*Primary Examiner*—John P. Sheehan
(74) *Attorney, Agent, or Firm*—Brinks Hofer Gilson & Lione

(57) ABSTRACT

A soft magnetic film is formed which is represented by the formula $(Fe_xNi_y)_aMo_b$, in which $0.65 \leq x \leq 0.75$ and $x+y=1$ are satisfied when x and y are on a mass percent ratio basis, and $0<b\leq 5$ and $a+b=100$ are satisfied when a and b are on a mass percent basis, and by using this soft magnetic film, a lower core layer and/or an upper core layer is formed. Accordingly, a saturated magnetic flux density of 1.6 T or more and a resistivity of 40 $\mu\Omega\cdot cm$ or more can be obtained, and hence a thin film magnetic head having a small loss in a high frequency signal region can be provided.

8 Claims, 11 Drawing Sheets

SOFT MAGNETIC FILM AND THIN FILM MAGNETIC HEAD USING THE SAME

BACKGROUND OF THE INVENTION

1. Field of the Invention

The present invention relates to a soft magnetic film which is used, for example, as a core material of a thin film magnetic head and which is composed of an FeNiMo alloy having a high resistivity and a high saturated magnetic flux density, and to a thin film magnetic head using the soft magnetic film described above.

2. Description of the Related Art

In planar magnetic elements such as a thin film magnetic head or a thin film inductor, a NiFe alloy (permalloy) has been used as a magnetic material in many cases.

Since, for example, the NiFe alloy mentioned above has relatively superior soft magnetic properties and is easily formed by plating, the NiFe alloy has become one of soft magnetic materials which are frequently used.

However, concomitant with the recent trend toward a high frequency current of a planar magnetic element, an eddy current loss in a high frequency current region becomes a problem.

In order to reduce the eddy current loss, a soft magnetic film having a high resistivity is advantageously used.

For example, in Japanese Unexamined Patent Application Publication No. 8-212512 (Patent publication 1), in order to reduce an eddy current loss in high frequency recording, a thin film magnetic head composed of a soft magnetic film is disclosed, in which the soft magnetic film has a resistivity of 40 ||Ω·cm or more by adding molybdenum (Mo) to a binary NiFe alloy.

Patent Publication 1

Japanese Unexamined Patent Application Publication No. 8-212512 (pp. 11 to 12, and FIGS. 16 to 18)

Patent Publication 2

Japanese Unexamined Patent Application Publication No. 9-63016 (pp. 5 to 6, and FIG. 5)

Patent Publication 3

Japanese Unexamined Patent Application Publication No. 2000-235911 (pp. 3 to 4, and FIG. 1)

Patent Publication 4

Japanese Unexamined Patent Application Publication No. 2000-58364

However, in the FeNiMo alloy film disclosed in Japanese Unexamined Patent Application Publication No. 8-212512, when the composition ratio of Fe to Ni is more than 60%, a saturated magnetic flux density Bs is rapidly decreased. As a result, the saturated magnetic flux density Bs of the FeNiMo alloy film disclosed in Japanese Unexamined Patent Application Publication No. 8-212512 is decreased to 1.6 tesla (T) or less. From a theoretical point of view, when the Fe content of an FeNiMo alloy film is increased, the saturated magnetic flux density thereof is also increased; however, it is believed that, according to Japanese Unexamined Patent Application Publication No. 8-212512, a stable FeNiMo alloy film having a composition ratio of Fe to Ni of more than 60% cannot be formed. According to the patent described above, this FeNiMo alloy is formed by direct current plating.

In addition, in Patent Publications 2 to 4, although FeNiMo alloy films are also disclosed, all of them are not stable FeNiMo alloy films having a composition ratio of Fe to Ni of more than 60%.

However, concomitant with the recent trend toward higher recording density, in order to improve recording density, it has been desired that the Fe content in the FeNiMo alloy is further increased so as to further increase the saturated magnetic flux density Bs.

SUMMARY OF THE INVENTION

Accordingly, the present invention was made to solve the problem described above, and an object of the present invention is to provide a soft magnetic film composed of an FeNiMo alloy and a thin film magnetic head using the same, in which, even when the Fe content is high as compared to that in the past, the FeNiMo alloy stably shows a high saturated magnetic flux density Bs together with a high resistivity.

A soft magnetic film in accordance with one aspect of the present invention is represented by $(Fe_xNi_y)_aMo_b$, and is formed by plating, wherein $0.65 \leq x \leq 0.75$ and $x+y=1$ are satisfied when x and y are on a mass percent ratio basis, and $0 < b \leq 5$ and $a+b=100$ are satisfied when a and b are on a mass percent basis.

In the present invention, the composition ratio x of Fe of a soft magnetic film composed of the FeNiMo alloy is defined. The saturated magnetic flux density Bs primarily depends on the composition ratio x of Fe, and the Bs is increased as the composition ratio x of Fe is increased. The reason for this relates to atom's magnetic moment indicated by Slater-Pauling's curve. However, when the composition ratio of Fe is increased to a certain level or more, it is believed that a growth process of a plating film is interfered with, a dense crystal cannot be formed, and the Bs described above is decreased.

In the present invention, the soft magnetic film described above is formed by plating. By plating, the thickness of the soft magnetic film can be relatively freely changed, and when frame plating is used, the soft magnetic film described above can be formed so as to have a large thickness and an optional shape. In addition, the soft magnetic film formed by plating tends to have a uniform thickness as compared to that of a soft magnetic film obtained by vacuum deposition such as sputtering. When the thickness of the soft magnetic film is increased, the difference in uniformity of film thickness between the soft magnetic film formed by plating and that formed by vacuum deposition such as sputtering is increased.

In particular, in the present invention, since pulse current plating is used, and the composition of a plating bath is appropriately controlled, a soft magnetic film composed of an FeNiMo alloy can be obtained which has a high Fe content and a high saturated magnetic flux density.

In accordance with a manufacturing method which will be described later, instead of direct current plating, pulse current plating is used, and the composition of a plating bath is also appropriately controlled. As a result, a soft magnetic film can be obtained which has the above-mentioned composition ratio x of Fe and which is composed of a stable FeNiMo alloy.

In addition, in the soft magnetic film of the present invention, since Mo is contained at the composition ratio described above, the resistivity is increased.

In particular, the resistivity of the soft magnetic film described above can be increased to 40 μΩ·cm or more.

According to the present invention, a soft magnetic film composed of an FeNiMo alloy can be obtained having a mass percent ratio x of Fe to Ni of 0.65 or more and a resistivity of 55 μΩ·cm or more.

In addition, according to the present invention, a soft magnetic film composed of an FeNiMo alloy can be obtained having a mass percent ratio x of Fe to Ni of 0.65 or more and a resistivity of 70 μΩ·cm or more.

Furthermore, according to the present invention, a soft magnetic film composed of an FeNiMo alloy can be obtained having a mass percent ratio x of Fe to Ni of 0.65 or more and a resistivity of 75 μΩ·cm or more.

In addition, according to the present invention, a soft magnetic film composed of an FeNiMo alloy can be obtained having a mass percent ratio x of Fe to Ni of 0.70 or more and a resistivity of 45 μΩ·cm or more.

Furthermore, according to the present invention, a soft magnetic film composed of an FeNiMo alloy can be obtained having a mass percent ratio x of Fe to Ni of 0.70 or more and a resistivity of 70 μΩ·cm or more.

The soft magnetic film according to the present invention is composed of an FeNiMo alloy in which the mass percent ratio of Fe to Ni is 0.65 or more, and more preferably 0.70 or more. Although having a high Fe content as described above, the soft magnetic film of the present invention described above can stably show a high saturated magnetic flux density Bs, such as 1.50 (T) or more, 1.67 (T) or more, 1.78 (T) or more, or 1.90 (T) or more. The soft magnetic film described above is the present invention. The reasons the high Fe content and the high saturated magnetic flux density can be simultaneously achieved according to the present invention are that pulse current plating is used and that the composition of a plating bath is appropriately controlled.

In addition to the mass percent ratio x of Fe to Ni, the saturated magnetic flux density Bs of the soft magnetic film according to the present invention is also defined by the mass percent b of Mo. When the mass percent b of Mo is increased, the resistivity ρ of an FeNiMo alloy is increased, and the eddy current loss in a high frequency region can be effectively reduced; however, the saturated magnetic flux density is decreased. However, as is the case of the present invention, when the mass percent ratio x of Fe to Ni is 0.65 or more, and the mass percent of Mo in the FeNiMo alloy is in the range of from more than zero to 5 mass percent, a soft magnetic film composed of the FeNiMo alloy described above having a saturated magnetic flux density of 1.50 (T) or more can be surely obtained.

The relationship between the Mo content in an FeNiMo alloy and the saturated magnetic flux density Bs will be described in detail in an example described below.

In addition, according to the soft magnetic film of the present invention, a coercive force Hc of 96 A/m or less can be obtained.

A thin film magnetic head in accordance with another aspect of the present invention comprises: a lower core layer composed of a magnetic material; an upper core layer formed above the lower core layer with a magnetic gap provided therebetween; and a coil layer applying a recording magnetic field to the two core layers, wherein at least one of the core layers is formed of the soft magnetic film described above.

The thin film magnetic head according to the present invention preferably further comprises a bulged lower magnetic pole layer on the lower core layer at a face opposing a recording medium.

The thin film magnetic head according to the present invention may further comprise a magnetic pole portion which is disposed between the lower core layer and the upper core layer, the width of the magnetic pole portion in a track width direction being set to smaller than that of each of the lower core layer and the upper core layer.

It is preferable that the magnetic pole portion described above be formed of a lower magnetic pole layer in contact with the lower core layer, an upper magnetic pole layer in contact with the upper core layer, and a gap layer located between the lower magnetic pole layer and the upper magnetic pole layer or be formed of an upper magnetic pole layer in contact with the upper core layer and a gap layer located between the upper magnetic pole layer and the lower core layer.

In addition, in the thin film magnetic head according to the present invention, at least a part of the core layers, which is adjacent to the magnetic gap, is preferably composed of at least two magnetic layers, or at least one of the magnetic pole layers is preferably composed of at least two magnetic layers, and at least one of the magnetic layers, which is disposed away from the magnetic gap, is formed of the soft magnetic film described above.

As described above, the FeNiMo alloy used as the soft magnetic film of the present invention has both a high saturated magnetic flux density Bs and a high resistivity. When the soft magnetic film described above is used as a core layer of a thin film magnetic head, while the magnetic flux is concentrated in the vicinity of the gap, the current loss in a high frequency region can be reduced, and hence the trend toward higher recording density can be facilitated.

DESCRIPTION OF THE PREFERRED EMBODIMENTS

Figure 1:
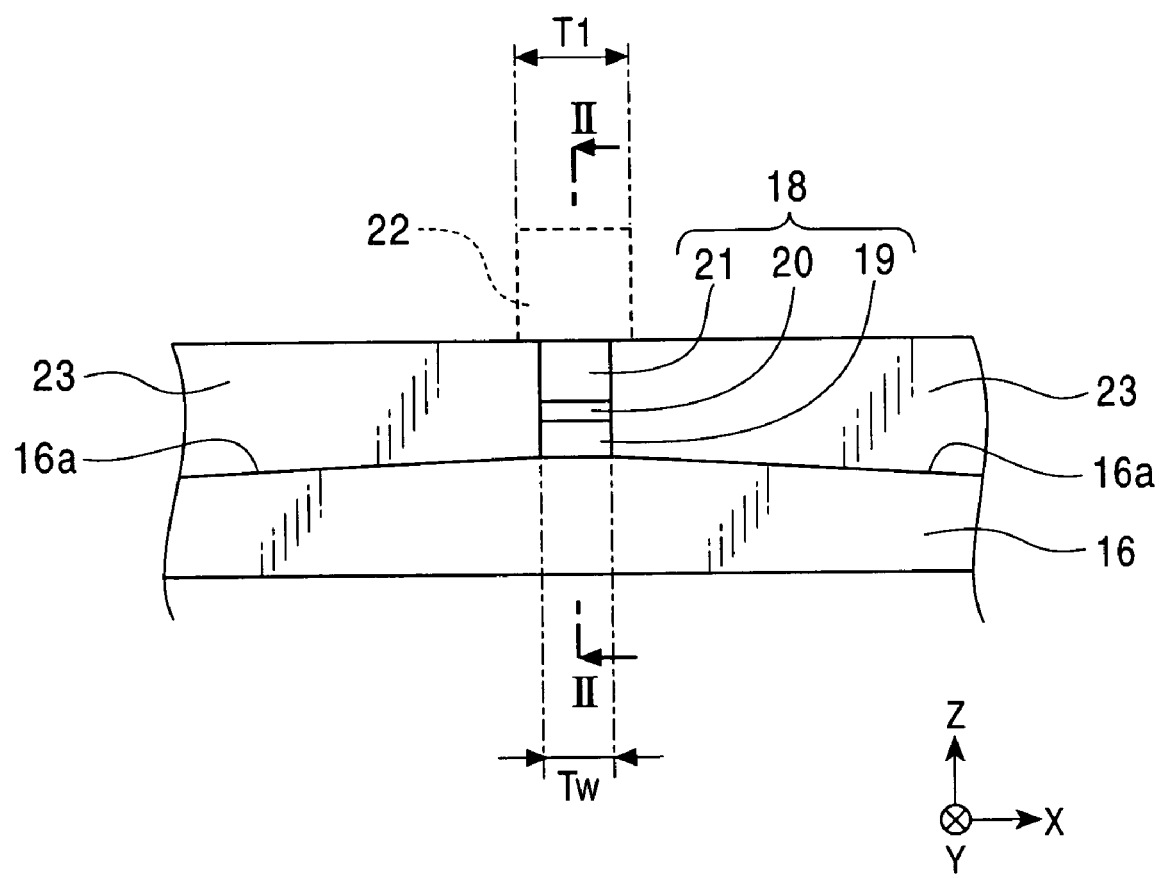
FIG. 1 is a partial front view of a thin film magnetic head according to a first embodiment of the present invention.
Figure 2:
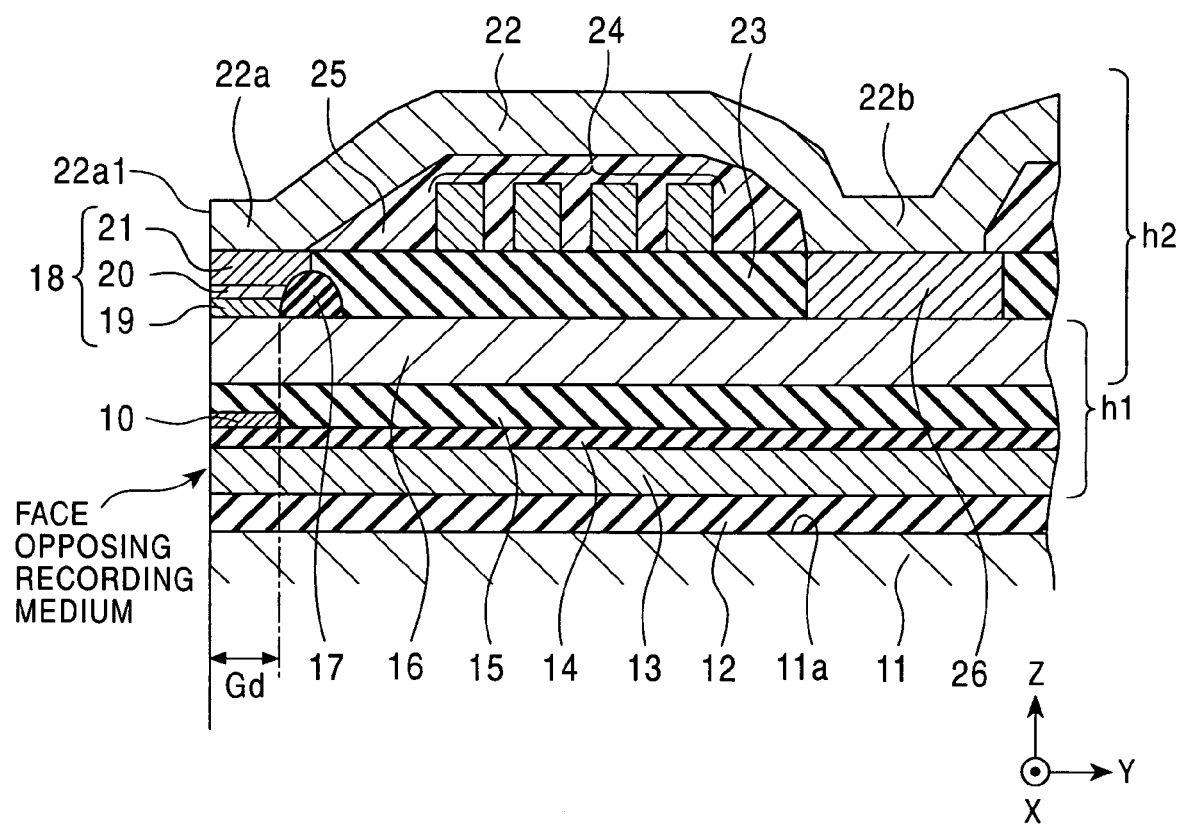
FIG. 2 is a vertical cross-sectional view of the thin film magnetic head shown in FIG. 1.

FIG. 1 is a partial front view of a thin film magnetic head of a first embodiment of the present invention, and FIG. 2 is a vertical cross-sectional view of the thin film magnetic head shown in FIG. 1 taken along the line II—II, the head being viewed along the arrow.

The thin film magnetic head of the present invention is provided on a trailing-side end surface 11a of a slider 11, which slider 11 is composed of a ceramic material and which forms a floating head, and an inductive head h2 for writing is provided on an MR head h1 to form an MR/inductive composite thin film magnetic head (hereinafter simply referred to as a "thin film magnetic head").

The MR head h1 detects a leakage magnetic field from a recording medium such as a hard disc by using a magnetoresistive effect so as to read a recording signal.

As shown in FIG. 2, above the trailing-side end surface 11a of the slider 11 described above, a lower shield layer 13 composed of a magnetic material such as NiFe is formed with an $Al_2O_3$ film 12 provided therebetween, and a lower gap layer 14 composed of an insulating material is further formed on the lower shield layer 13.

On the lower gap layer 14, a magnetoresistive effect element 10, such as an anisotropic magnetoresistive effect (AMR) element, a giant magnetoresistive effect (GMR) element, or a tunnel magnetoresistive effect (TMR) element, is formed from a face opposing a recording medium in a height direction (Y direction in the figure), and on the magnetoresistive effect element 10 and the lower gap layer 14, an upper gap layer 15 composed of an insulating material is provided. Furthermore, on the upper gap layer 15, an upper shield layer 16 composed of a magnetic material such as NiFe is provided. The MR head h1 has a multilayer structure composed of the layers described above, that is, from the lower shield layer 13 to the upper shield layer 16.

Next, in the embodiment shown in FIGS. 1 and 2, the upper shield layer 16 is also used as a lower core layer of the inductive head h2, and on the lower core layer 16, a Gd determining layer 17 is formed, and a gap depth (Gd) is defined by the length from the face opposing a recording medium to the front end of the Gd determining layer 17. The Gd determining layer 17 is formed, for example, of an insulating material.

In addition, as shown in FIG. 1, an upper surface 16a of the lower core layer 16 is an inclined surface which is gradually inclined from a base end of a magnetic pole portion 18 to both sides in a track width direction (X direction in the figure), and hence the generation of side fringe can be suppressed.

As shown in FIG. 2, the magnetic pole portion 18 is formed over the lower core layer 16 to the GD determining layer 17 from the face opposing a recording medium.

The magnetic pole portion 18 has a multilayer structure composed of a lower magnetic pole layer 19, a nonmagnetic gap layer 20, and an upper magnetic pole layer 21 provided in that order from the bottom.

The lower magnetic pole layer 19 is directly formed on the lower core layer 16 by plating. In addition, the gap layer 20 formed on the lower magnetic pole layer 19 is preferably formed of a nonmagnetic metal material which can be formed by plating. In particular, at least one material selected from the group consisting of NiP, NiPd, NiW, NiMo, Au, Pt, Rh, Pd, Ru, and Cr is preferably used.

As a particular embodiment of the present invention, NiP is used for the gap layer 20. The reason for this is that the gap layer 20 formed of NiP can be appropriately put in a nonmagnetic state.

In addition, the upper magnetic pole layer 21 formed on the gap layer 20 is magnetically coupled with an upper core layer 22 formed on the upper magnetic pole layer 21.

When the gap layer 20 is formed of a nonmagnetic metal material which can be formed by plating as described above, the lower magnetic pole layer 19, the gap layer 20, and the upper magnetic pole layer 21 can be sequentially formed by plating.

In addition, the magnetic pole portion 18 may be formed of two layers, that is, the gap layer 20 and the upper magnetic pole layer 21.

As shown in FIG. 1, the width dimension of the magnetic pole portion 18 in the track width direction (X direction in the figure) is a track width Tw.

As shown in FIGS. 1 and 2, an insulating layer 23 is formed at both sides of the magnetic pole portion 18 in the track width direction (X direction in the figure) and the rear side thereof in the height direction (Y direction in the figure). The upper surface of the insulating layer 23 is formed to be flush with the upper surface of the magnetic pole portion 18.

As shown in FIG. 2, a coil layer 24 having a spiral pattern is formed on the insulating layer 23. In addition, the coil layer 24 is covered with an insulating layer 25 composed of an organic insulating material.

As shown in FIG. 2, the upper core layer 22 is pattern-formed, for example, by frame plating over the magnetic pole portion 18 to the insulating layer 25. As shown in FIG. 1, a front end portion 22a of the upper core layer 22 is formed to have a width dimension T1 in the track width direction at the face opposing a recording medium, and the width dimension T1 is formed larger than the track width Tw. In addition, a front end surface 22a1 of the upper core layer 22 is located at a position away from the face opposing a recording medium in the height direction (Y direction in the figure). That is, in FIG. 1, the lower core layer 16 and the magnetic pole portion 18 are present at the face opposing a recording medium, and the front end surface 22a1 of the upper core layer 22 is not present at the face opposing a recording medium.

In addition, as shown in FIG. 2, a base end portion 22b of the upper core layer 22 is formed so as to be directly in contact with a coupling layer (back gap layer) 26 composed of a magnetic material which is formed on the lower core layer 16.

In the present invention, the upper core layer 22 and/or the lower core layer 16 is formed of a soft magnetic film having the following composition ratios.

The soft magnetic film is represented by $(Fe_xNi_y)_aMo_b$, in which $0.65 \leq x \leq 0.75$ and $x+y=1$ are satisfied when x and y are on a mass percent ratio basis, and $0<b\leq 5$ and $a+b=100$ are satisfied when a and b are on a mass percent basis.

In the present invention, the composition ratio x of Fe of a soft magnetic film formed of the FeNiMo alloy is defined. The saturated magnetic flux density Bs primarily depends on the composition ratio x of Fe, and the Bs is increased with increase of the composition ratio x of Fe. The reason for this relates to atom's magnetic moment indicated by Slater-Pauling's curve. However, it is believed that when the composition ratio of Fe is increased to a certain level or more, a growth process of a plating film is interfered with, a dense crystal cannot be formed, and the Bs described above is decreased.

In a manufacturing method of the present invention, which will be described later, pulse current plating is used in place of direct current plating, and a plating bath composition is appropriately controlled. As a result, a soft magnetic film can be obtained which has the composition ratio x of Fe mentioned above and which is composed of a stable FeNiMo alloy.

In addition, in the soft magnetic film of the present invention, since Mo is contained at the composition ratio mentioned above, the resistivity is increased.

In particular, the resistivity of the soft magnetic film described above can be increased to 40 µΩ·cm or more.

In the present invention, the upper core layer 22 and/or the lower core layer 16 can be formed of a soft magnetic film composed of an FeNiMo alloy having a mass percent ratio x of Fe of 0.65 or more and a resistivity of 55 µΩ·cm or more.

Furthermore, in the present invention, the upper core layer 22 and/or the lower core layer 16 can be formed of a soft magnetic film composed of an FeNiMo alloy having a mass percent ratio x of Fe of 0.65 or more and a resistivity of 70 µΩ·cm or more.

In the present invention, the soft magnetic film is preferably formed by plating. By plating, the thickness of the soft magnetic film can be relatively freely changed, and a soft magnetic film having a large thickness can be formed.

In addition, the upper core layer 22 and/or the lower core layer 16 is formed of a soft magnetic film composed of an FeNiMo alloy in which the mass percent ratio x of Fe to Ni is 0.65 or more, and more preferably 0.70 or more. Even the Fe content is high as described above, a saturated magnetic flux density Bs of 1.50 (T) or more, 1.67 (T) or more, 1.78 (T) or more, or 1.90 (T) or more can be reliably obtained. In the present invention, the reasons the high saturated magnetic flux density and the high Fe content can be achieved are that pulse current plating is used and that the plating bath composition is appropriately controlled.

In addition, the saturated magnetic flux density Bs of the soft magnetic film of the present invention is defined by the mass percent b of Mo in addition to the mass percent ratio x of Fe to Ni. When the mass percent b of Mo is increased, the resistivity ρ of the FeNiMo alloy is increased, and the eddy current loss can be effectively reduced in a high frequency region; however, the saturated magnetic flux density is decreased. In the present invention, when the mass percent of Mo of the FeNiMo alloy is in the range of from more than zero to 5 mass percent, a soft magnetic film can be reliably obtained which is formed of the FeNiMo alloy described above having a saturated magnetic flux density of 1.50 (T) or more.

The relationship of the Mo content of the FeNiMo alloy with the resistivity ρ and the saturated magnetic flux density Bs will be described in detail in the example described later.

The soft magnetic film forming the upper core layer 22 and/or the lower core layer 16 may have a coercive force Hc of 96 (A/m) or less.

As described above, the FeNiMo alloy of the present invention used as a soft magnetic film has both a high saturated magnetic flux density Bs and a high resistivity. When the soft magnetic film described above is used as a core material of a thin film magnetic head, while the magnetic flux is concentrated in the vicinity of the gap, the eddy current loss can be reduced in a high frequency region, and hence the trend toward higher recording density can be facilitated.

A soft magnetic film formed of the FeNiMo alloy described above may be used for a thin film magnetic head according to another embodiment.

Figure 3:
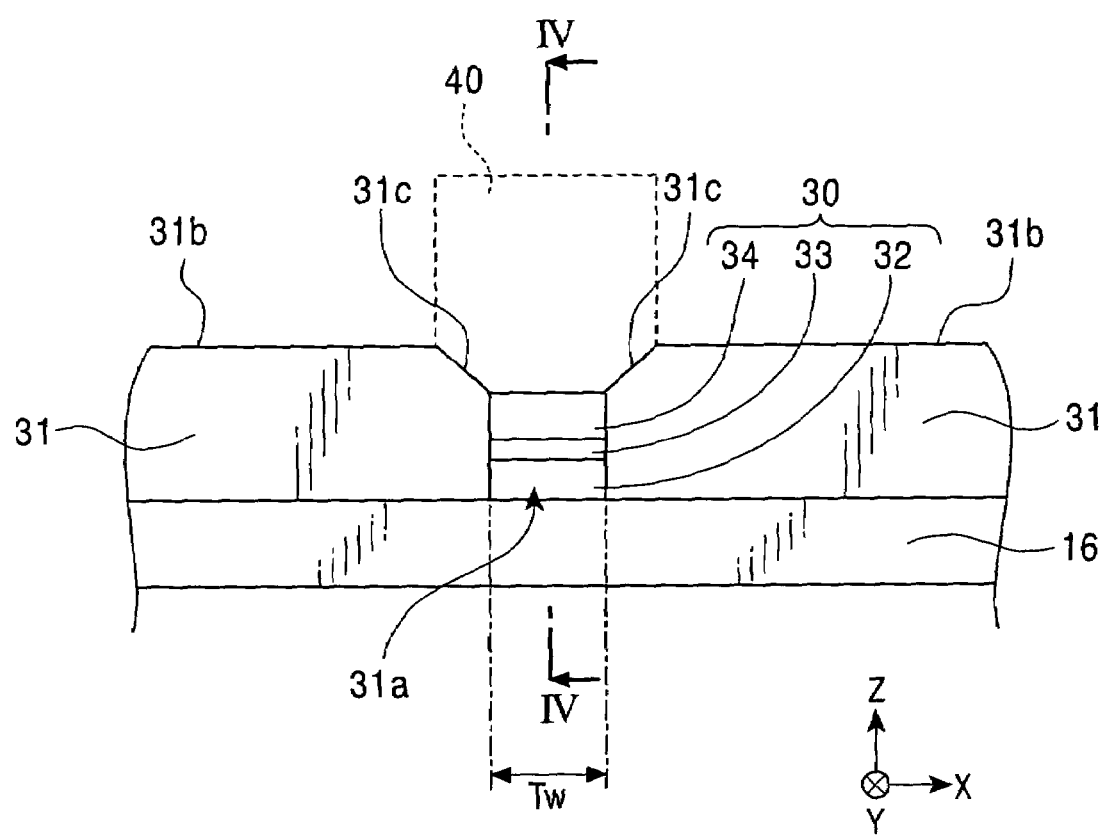
FIG. 3 is a partial front view of a thin film magnetic head according to a second embodiment of the present invention.
Figure 4:
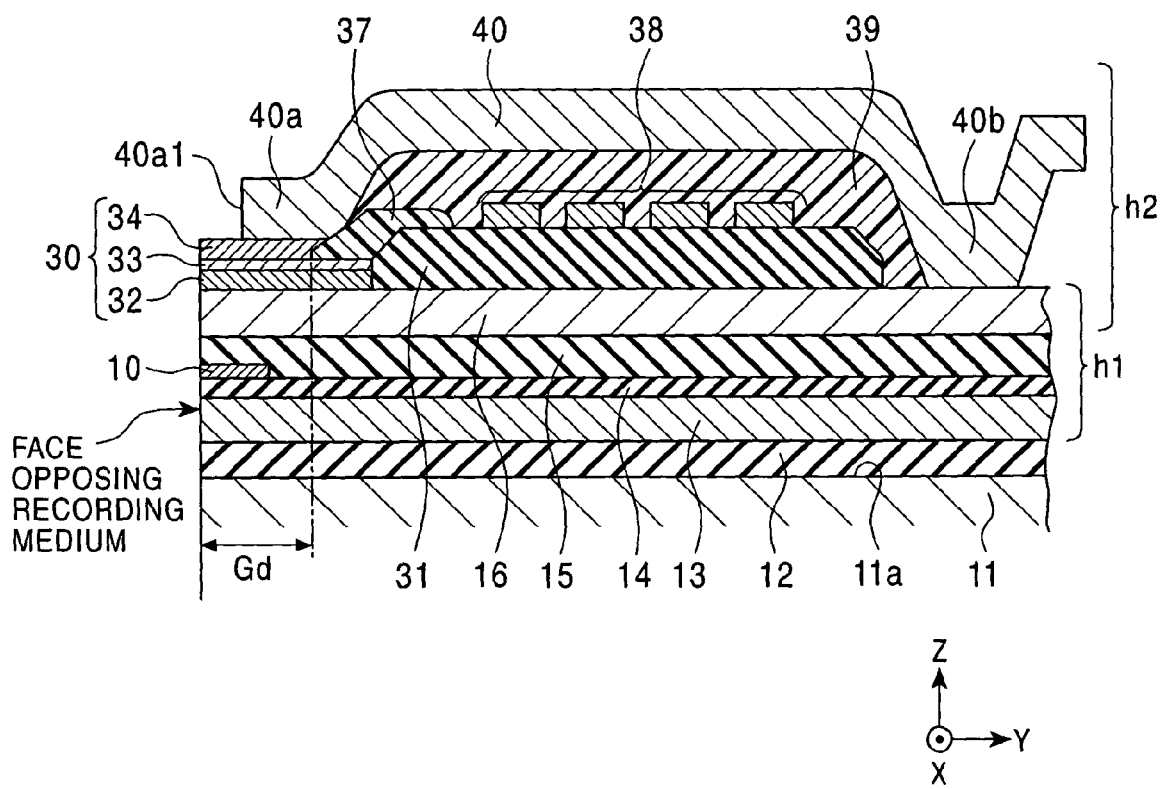
FIG. 4 is a vertical cross-sectional view of the thin film magnetic head shown in FIG. 3.

FIG. 3 is a partial front view showing the structure of a thin film magnetic head of a second embodiment according to the present invention, and FIG. 4 is a vertical cross-sectional view of the thin film magnetic head shown in FIG. 3 taken along the line IV—IV, the head being viewed along the arrow.

In this embodiment, the structure of the MR head h1 is the same as that shown in FIGS. 1 and 2.

As shown in FIG. 3, on the lower core layer 16, an insulating layer 31 is formed. In the insulating layer 31, a track width forming groove 31a having a predetermined length is formed from the face opposing a recording medium to the rear side in the height direction (Y direction in the figure). The track width forming groove 31a has the track width Tw at the face opposing a recording medium (see FIG. 3).

In the track width forming groove 31a, a magnetic pole portion 30 is formed having a lower magnetic pole layer 32, a nonmagnetic gap layer 33, and an upper magnetic pole layer 34 provided in that order from the bottom.

The lower magnetic pole layer 32 is formed directly on the lower core layer 16 by plating. In addition, the gap layer 33 provided on the lower magnetic pole layer 32 is preferably formed of a nonmagnetic metal material which can be formed by plating. In particular, at least one material selected from the group consisting of NiP, NiPd, NiW, NiMo, Au, Pt, Rh, Pd, Ru, and Cr is preferably used.

As a particular embodiment of the present invention, NiP is used for the gap layer 33. The reason for this is that the gap layer 33 formed of NiP can be appropriately put in a nonmagnetic state.

The magnetic pole portion 30 described above may be formed of two layers, that is, the gap layer 33 and the upper magnetic pole layer 34.

A gap depth (Gd) determining layer 37 is formed over the gap layer 33 to the insulating layer 31 from a position at a distance of gap depth (Gd) away from the face opposing a recording medium.

The upper magnetic pole layer 34 formed on the gap layer 33 is magnetically coupled with an upper core layer 40 which is formed on the upper magnetic pole layer 34. In addition, a front end surface 40a1 of the upper core layer 40 is located at a position away from the face opposing a recording medium in the height direction (Y direction in the figure). That is, in FIG. 3, the lower core layer 16 and the magnetic pole portion 30 are present at the face opposing a recording medium, and the front end surface 40a1 of the upper core layer 40 is not present.

When the gap layer 33 is formed of a nonmagnetic metal material which can be formed by plating as described above, the lower magnetic pole layer 32, the gap layer 33, and the upper magnetic pole layer 34 can be sequentially formed by plating.

As shown in FIG. 4, on the insulating layer 31, a coil layer 38 having a spiral pattern is formed. The coil layer 38 is covered with an insulating layer 39 formed of an organic insulating material or the like.

As shown in FIG. 3, on two side surfaces of the track width forming groove 31a in the track width direction (X direction in the figure), inclined surfaces 31c and 31c are formed so that the width therebetween is gradually increased from the upper surface of the upper magnetic pole layer 34 to an upper surface 31b of the insulating layer 31 in the direction away from the lower core layer 16.

In addition, as shown in FIG. 3, a front end portion 40a of the upper core layer 40 is formed over the upper surface of the upper magnetic pole layer 34 to the inclined surfaces 31c and 31c in the direction away from the lower core layer 16.

As shown in FIG. 4, the upper core layer 40 is formed on the insulating layer 39 from a position adjacent to the face opposing a recording medium in the height direction (Y direction in the figure), and a base end portion 40b of the upper core layer 40 is directly formed on the lower core layer 16.

In the second embodiment of the present invention shown in FIGS. 3 and 4, the lower core layer 16 and/or the upper core layer 40 is formed of a soft magnetic film composed of an FeNiMo alloy represented by $(Fe_xNi_y)_aMo_b$, in which $0.65 \leq x \leq 0.75$ and $x+y=1$ are satisfied when x and y are on a mass percent ratio basis, and $0 < b \leq 5$ and $a+b=100$ are satisfied when a and b are on a mass percent basis.

The FeNiMo alloy has both a high saturated magnetic flux density Bs and a high resistivity. When the soft magnetic film described above is used as the lower magnetic pole layer 32 and the upper magnetic pole layer 34 of the thin film magnetic head, while the magnetic flux can be concentrated in the vicinity of the gap, the eddy current loss can be reduced in a high frequency region, and hence the trend toward higher recording density can be facilitated.

In the embodiments shown in FIGS. 1 to 4, the magnetic pole portion 18 is provided between the lower core layer 16 and the upper core layer 22, the magnetic pole portion 30 is provided between the lower core layer 16 and the upper core layer 40, the lower core layer 16 and/or the upper core layer 22 is formed of a soft magnetic film composed of the FeNiMo alloy described above, and the lower core layer 16 and/or the upper core layer 40 is formed of a soft magnetic film composed of the FeNiMo alloy described above. In addition, according to the present invention, the lower magnetic pole layer 19 and/or the upper magnetic pole layer 21 may be formed of a soft magnetic film composed of the FeNiMo alloy described above, and the lower magnetic pole layer 32 and/or the upper magnetic pole layer 34 may be formed of a soft magnetic film composed of the FeNiMo alloy described above.

However, the lower magnetic pole layer 19 and/or the upper magnetic pole layer 21 preferably has a higher saturated magnetic flux density than that of the lower core layer 16 and the upper core layer 22, and the lower magnetic pole layer 32 and/or the upper magnetic pole layer 34 preferably has a higher saturated magnetic flux density than that of the lower core layer 16 and the upper core layer 40.

In addition, the lower magnetic pole layer 19 and/or the upper magnetic pole layer 21 may be formed of at least two magnetic layers placed one over the other, and the lower magnetic pole layer 32 and/or the upper magnetic pole layer 34 may be formed of at least two magnetic layers placed one over the other. In the case described above, it is preferable that a magnetic layer provided away from each of the gap layers 20 and 33 be formed of a soft magnetic film composed of an FeNiMo alloy, and a magnetic layer in contact with each of the gap layers 20 and 33 have a saturated magnetic flux density higher than that of the magnetic layer provided away therefrom. Accordingly, since the magnetic flux can be concentrated in the vicinity of the gap, and the loss in a high frequency region can be reduced, a thin film magnetic head can be manufactured which can meet the trend toward higher recording density.

In addition, the saturated magnetic flux densities Bs of the lower magnetic pole layers 19 and 32 are preferably high. However, when the saturated magnetic flux densities Bs of the lower magnetic pole layers 19 and 32 are decreased lower than those of the upper magnetic pole layers 21 and 34, respectively, magnetization inversion of a leakage magnetic field between the lower magnetic pole layer and the upper pole magnetic layer is likely to occur, and as a result, signal writing density on a recording medium can be further increased.

Figure 5:
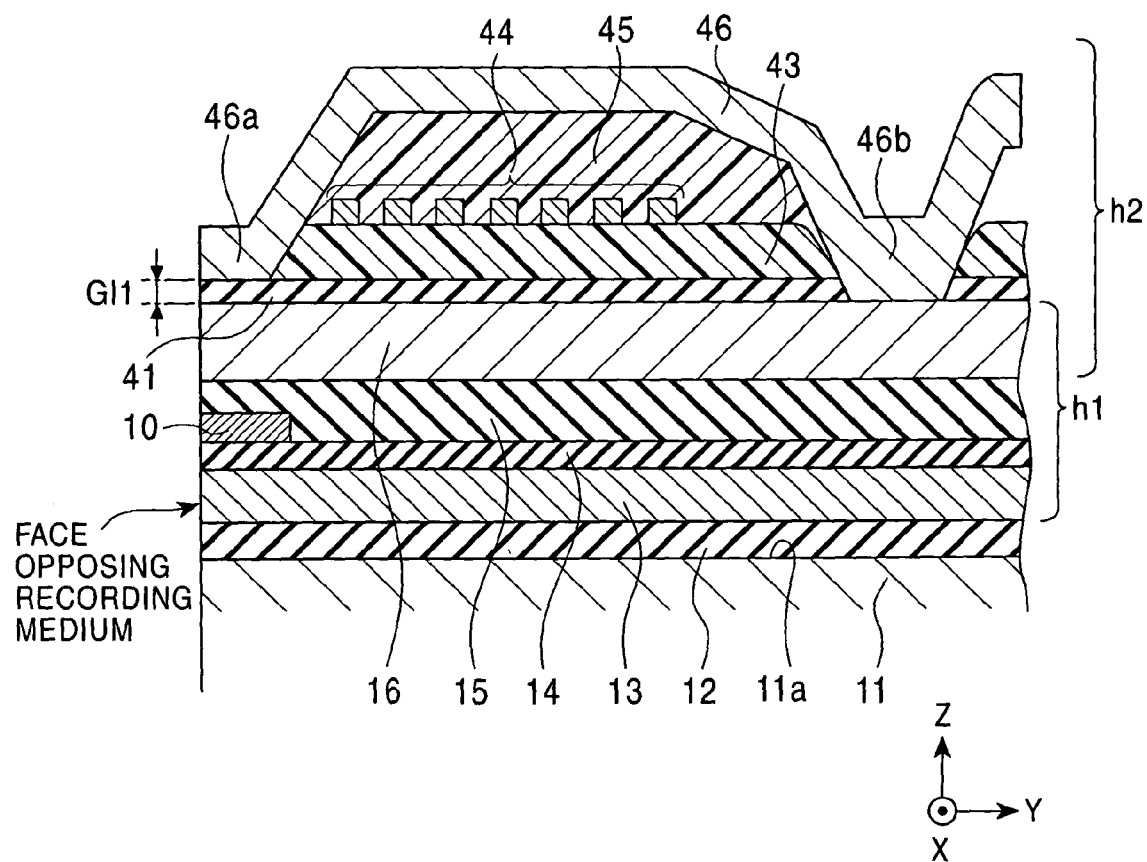
FIG. 5 is a vertical cross-sectional view of a thin film magnetic head according to a third embodiment of the present invention.

FIG. 5 is a vertical cross-sectional view of a thin film magnetic head of a third embodiment according to the present invention.

In this embodiment, the MR head h1 is the same as shown in FIG. 1. As shown in FIG. 5, on the lower core layer 16, a magnetic gap layer (nonmagnetic material layer) 41 composed of alumina or the like is formed. In addition, above the magnetic gap layer 41, a coil layer 44 having a planar spiral pattern is formed with an insulating layer 43 of a polyimide resin or a resist material provided therebetween. The coil layer 44 described above is formed of a nonmagnetic conductive material, such as copper (Cu), having small electric resistance.

Furthermore, the coil layer 44 described above is covered with an insulating layer 45 formed of a polyimide resin or a resist material, and on this insulating layer 45, an upper core layer 46 composed of a soft magnetic material is formed.

As shown in FIG. 5, a front end portion 46a of the upper core layer 46 is disposed above the lower core layer 16 with the magnetic gap layer 41 provided therebetween at the face opposing a recording medium, thereby forming a magnetic gap having a magnetic gap length G11. In addition, as shown in FIG. 5, a base end portion 46b of the upper core layer 46 is magnetically coupled with the lower core layer 16.

In the present invention, the lower core layer 16 and/or the upper core layer 46 is formed of a soft magnetic film composed of an FeNiMo alloy represented by $(Fe_xNi_y)_aMo_b$, in which $0.65 \leq x \leq 0.75$ and $x+y=1$ are satisfied when x and y are on a mass percent ratio basis, and $0 < b \leq 5$ and $a+b=100$ are satisfied when a and b are on a mass percent basis.

The FeNiMo alloy described above has both a high saturated magnetic flux density Bs and a high resistivity. When the soft magnetic film described above is used as the lower core layer 32 and the upper core layer 34 of the thin film magnetic head, while the magnetic flux can be concentrated in the vicinity of the gap, the eddy current loss can be reduced in a high frequency region, and hence the trend toward higher recording density can be facilitated.

Figure 6:
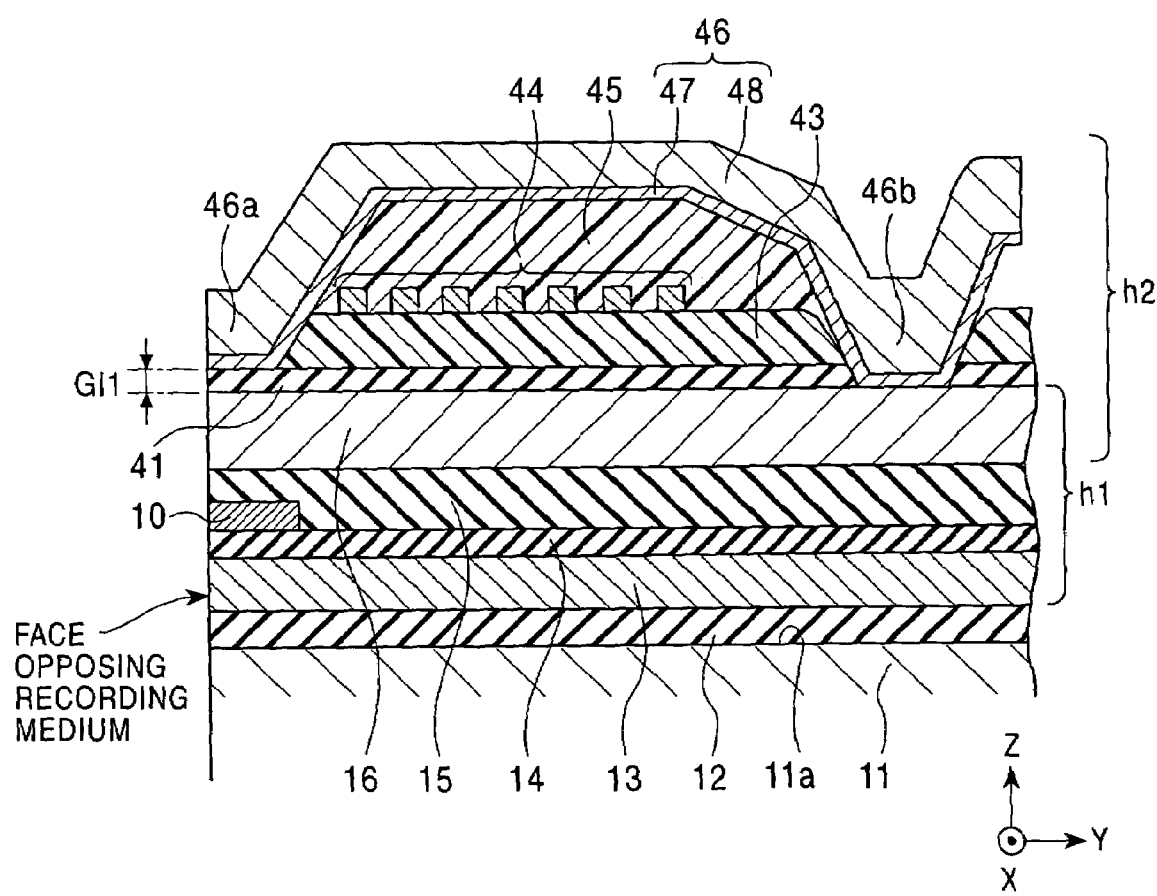
FIG. 6 is a vertical cross-sectional view of a thin film magnetic head according to a fourth embodiment of the present invention.

FIG. 6 is a vertical cross-sectional view of a thin film magnetic head of a fourth embodiment according to the present invention.

The point of this thin film magnetic head different from that shown in FIG. 5 is the structure of the upper core layer 46 which is composed of two magnetic layers.

The upper core layer 46 is formed of a high Bs layer 47 having a high saturated magnetic flux density Bs and an upper layer 48 provided thereon.

The upper layer 48 is formed of a soft magnetic film composed of an FeNiMo alloy represented by $(Fe_xNi_y)_aMo_b$, in which $0.65 \leq x \leq 0.75$ and $x+y=1$ are satisfied when x and y are on a mass percent ratio basis, and $0 < b \leq 5$ and $a+b=100$ are satisfied when a and b are on a mass percent basis.

The upper layer 48 forming the upper core layer 46 has a higher resistivity than that of the high Bs layer 47. The high Bs layer 47 is formed, for example, of a NiFe alloy, and in this case, the Fe content of the upper layer 48 is preferably smaller than that of the high Bs layer 47. Accordingly, the high Bs layer 47 has a saturated magnetic flux density Bs higher than that of the upper layer 48, the magnetic flux can be concentrated in the vicinity of the gap, and as a result, the recording resolution can be improved.

Since the upper core layer 46 comprises the upper layer 48 formed of a soft magnetic film of the FeNiMo alloy having a high resistivity, the eddy current loss, which is generated when the recording frequency is increased, can be reduced, and as a result, a thin film magnetic head can be manufactured which can meet the trend toward higher recording frequency.

In the present invention, as shown in FIG. 6, the high Bs layer 47 is preferably formed at the lower side so as to face the gap layer 41. In addition, the high Bs layer 47 may be formed only at the front end portion 46a of the upper core layer 46 which is in direct contact with the gap layer 41.

The lower core layer 16 may also be formed of two layers, that is, a high Bs layer and a high resistivity layer.

In this case, the Bs layer is provided on the high resistivity layer and faces the upper core layer 46 with the gap layer 41 provided therebetween.

In addition, in the embodiment shown in FIG. 6, the upper core layer 46 has a two-layered structure; however, the upper core layer 46 may be composed of at least three layers. In the structure described above, the high Bs layer 47 is preferably formed at the side which is in contact with the magnetic gap layer 41.

Figure 7:
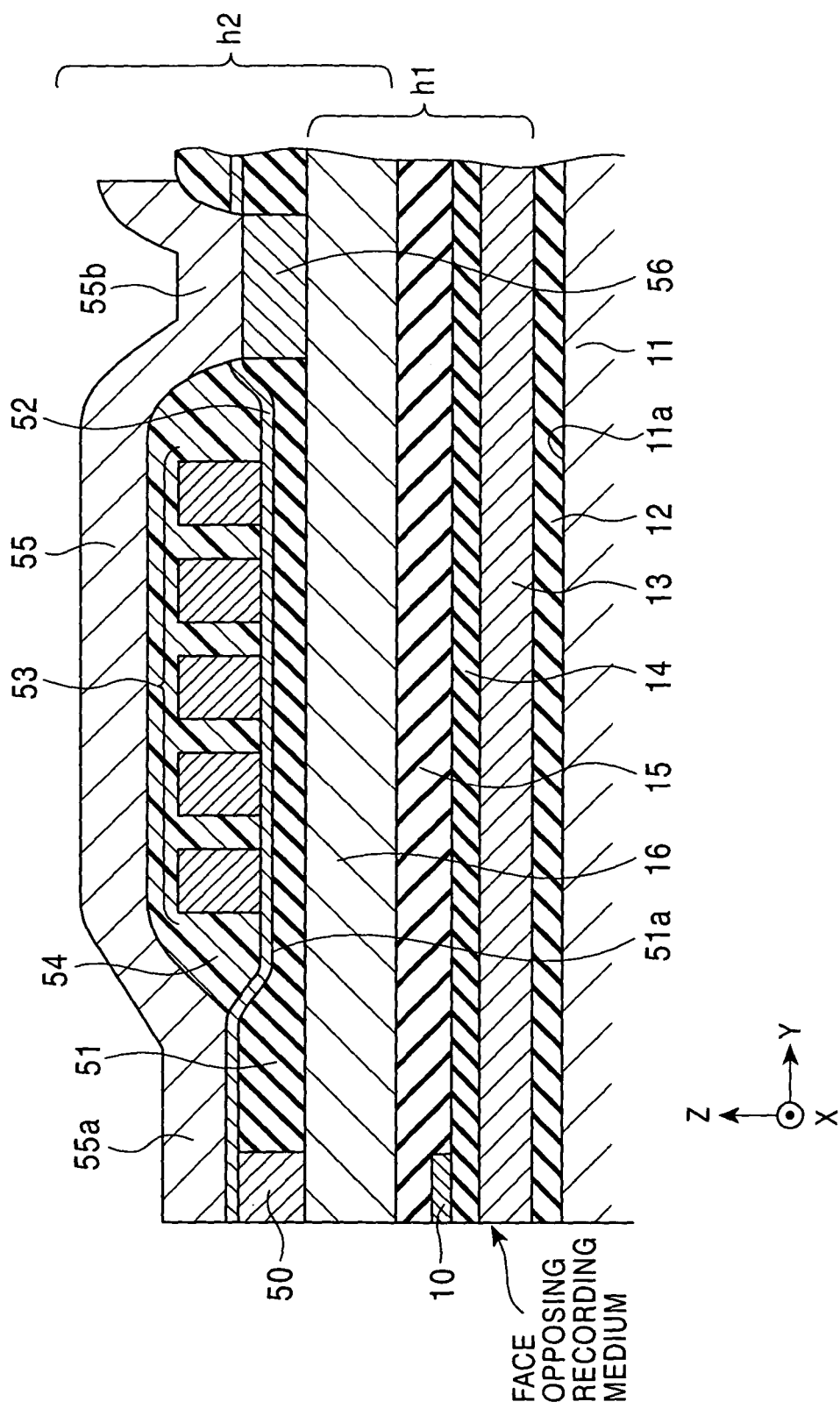
FIG. 7 is a vertical cross-sectional view of a thin film magnetic head according to a fifth embodiment of the present invention.

FIG. 7 is a vertical cross-sectional view of a thin film magnetic head of a fifth embodiment according to the present invention.

In the embodiment shown in FIG. 7, the structure of the MR head h1 is the same as that shown in FIG. 1. As shown in FIG. 7, a bulged lower magnetic pole layer 50 is formed on the lower core layer 16 from the face opposing a recording medium. An insulating layer 51 is formed at the rear side of the lower magnetic pole layer 50 in the height direction (Y direction in the figure). On the upper surface of the insulating layer 51, a coil forming surface 51a having a concave shape is formed.

A gap layer 52 is formed over the lower magnetic pole layer 50 to the insulating layer 51. In addition, above the coil forming surface 51a of the insulating layer 51, a coil layer 53 is formed with the gap layer 52 provided therebetween. The coil layer 53 is covered with an insulating layer 54 composed of an organic insulating material.

As shown in FIG. 7, an upper core layer 55 having a pattern is formed, for example, by frame plating over the gap layer 52 to the insulating layer 54.

A front end portion 55a of the upper core layer 55 is formed on the gap layer 52 so as to face the lower magnetic pole layer 50. A base end portion 55b of the upper core layer 55 is magnetically coupled with the lower core layer 16 with a lifting layer 56 provided therebetween, which is formed on the lower core layer 16.

In this embodiment, the upper core layer 55 and/or the lower core layer 16 is formed of a soft magnetic film composed of an FeNiMo alloy represented by $(Fe_xNi_y)_aMo_b$, in which $0.65 \leq x \leq 0.75$ and $x+y=1$ are satisfied when x and y are on a mass percent ratio basis, and $0<b\leq5$ and $a+b=100$ are satisfied when a and b are on a mass percent basis.

In FIG. 7, when the lower magnetic pole layer 50 is formed so as to have a saturated magnetic flux density Bs higher than that of the lower core layer 16, the magnetic flux can be concentrated in the vicinity of the gap, and as a result, the recording density can be improved.

In addition, the entire upper core layer 55 may be formed of the FeNiMo alloy described above; however, as is the case shown in FIG. 6, the upper core layer 55 may have a multilayer structure containing at least two magnetic layers, and one of the magnetic layers away from the gap layer 52 may be formed of the FeNiMo alloy described above. In this case, when the front end portion 55a of the upper core layer 55 only has the multilayer structure described above, and a high Bs layer is formed directly on the gap layer 52, the magnetic flux can be preferably concentrated in the vicinity of the gap, and as a result, the recording density can be improved.

In the embodiments shown in FIGS. 1 to 7 according to the present invention, the soft magnetic film composed of the FeNiMo alloy is preferably formed by plating. In the present invention, the soft magnetic film composed of the FeNiMo alloy can be formed by pulse current plating. In addition, the soft magnetic film composed of the FeNiMo alloy may be formed by plating so as to have an optional thickness, and a film having a thickness larger than that obtained by sputtering can be formed.

In addition, in the embodiments described above, the layer indicated by reference numeral 16 is a layer which is used as both the lower core layer and the upper shield layer; however, the lower core layer and the upper shield layer may be separately formed. In this case, an insulating layer is provided between the lower core layer and the upper shield layer.

Next, general manufacturing methods of the thin film magnetic heads shown in FIGS. 1 to 7 will be described.

As for the thin film magnetic head shown in FIGS. 1 and 2, after the Gd determining layer 17 is formed on the lower core layer 16, the magnetic pole portion 18 composed of the lower magnetic pole layer 19, the nonmagnetic gap layer 20, and the upper magnetic pole layer 21 is sequentially formed by plating using a resist from the face opposing a recording medium in the height direction. Next, after the insulating layer 23 is formed at the rear side of the magnetic pole portion 18 in the height direction, the upper surface of the magnetic pole portion 18 and the upper surface of the insulating layer 23 are planarized, for example, by a CMP technique so as to be flush with each other. On the insulating layer 23, the coil layer 24 having a spiral pattern is formed, and the insulating layer 25 is then formed over the coil layer 24. Subsequently, the upper core layer 22 is formed, for example, by frame plating over the magnetic pole portion 18 to the insulating layer 25.

As for the thin film magnetic head shown in FIGS. 3 and 4, after the insulating layer 31 is formed on the lower core layer 16, the track width forming groove 31a is formed in the insulating layer 31 using a resist from the face opposing a recording medium to the rear side in the height direction. In addition, the inclined surfaces 31c and 31c shown in FIG. 3 are formed in the track width forming groove 31a.

In the track width forming groove 31a, the lower magnetic pole layer 32 and the nonmagnetic gap layer 33 are formed. After the Gd determining layer 37 is formed over the gap layer 33 to the insulating layer 31, the upper magnetic pole layer 34 is formed on the gap layer 33 by plating. Next, after the coil layer 38 having a spiral pattern is formed on the insulating layer 31, the insulating layer 39 is formed over the coil layer 38. Subsequently, the upper core layer 40 is formed, for example, by frame plating over the upper magnetic pole layer 34 to the insulating layer 39.

As for the thin film magnetic heads shown in FIGS. 5 and 6, after the gap layer 41 is first formed on the lower core layer 16, the insulating layer 43 is further formed, and the coil layer 44 having a pattern is formed on the insulating layer 43. After the insulating layer 45 is formed over the coil layer 44, the upper core layer 46 having a pattern is formed by frame plating over the gap layer 41 to the insulating layer 45.

As for the thin film magnetic head shown in FIG. 7, the lower magnetic pole layer 50 is first formed on the lower core layer 16 using a resist, and the insulating layer 51 is further formed at the rear side of the lower magnetic pole layer 50 in the height direction. After the upper surface of the lower magnetic pole layer 50 and the upper surface of the insulating layer 51 are planarized by a CMP technique, the coil forming surface 51a having a concave shape is formed on the upper surface of the insulating layer 51. Next, after the gap layer 52 is formed over the lower magnetic pole layer 50 to the insulating layer 51, the coil layer 53 having a spiral pattern is formed on the gap layer 52, and the insulating layer 54 is further formed on the coil layer 53. Subsequently, the upper core layer 55 is formed, for example, by frame plating over the gap layer 52 to the insulating layer 54.

In the present invention, a soft magnetic film composed of the FeNiMo alloy is formed by pulse current plating.

The pulse current plating is performed, for example, by repeating ON and OFF of a current control device so as to allow current to flow intermittently. Since no current flows for a predetermined period of time at regular intervals, the FeNiMo alloy film is slowly formed by plating, and even when the concentration of Fe ions in a plating bath is increased, the deviation of current density distribution can be reduced as compared to that obtained by a related plating technique using a direct current.

The pulse current is obtained by repeating ON and OFF at several-second intervals, and the duty ratio is preferably set to approximately 0.1 to 0.5. The conditions of the pulse current have influences on the average crystal grain diameter of the FeNiMo alloy and the center line average roughness Ra of the film surface.

As described above, since the pulse current plating can reduce the deviation of current density distribution in plating, the Fe content in the FeNiMo alloy can be increased as compared to that obtained by direct current plating.

In the present invention, as applications of the soft magnetic film composed of the FeNiMo alloy described above, the thin film magnetic heads shown in FIGS. 1 to 7 are shown; however the applications thereof are not limited thereto. For example, the soft magnetic film composed of the FeNiMo alloy may be applied to planar magnetic elements such as a thin film inductor.

EXAMPLE

In an example of the present invention, FeNiMo alloys were formed in a plating bath by pulse current plating. For comparison, NiFe alloys were also formed by pulse current plating in a manner similar to that in the example.

The composition of the plating bath for the NiFe alloy is shown in Table 1, and the composition of the plating bath for the FeNiMo alloy is shown in Table 2.

TABLE 1

| NiFe | |
|---|---|
| Fe Ion Concentration (g/l) | 1.0 to 3.3 |
| Ni Ion Concentration (g/l) | 10 |
| Fe Ion/Ni Ion | 0.10 to 0.33 |
| Boric Acid Concentration (g/l) | 25 |
| NaCl Concentration (g/l) | 25 |
| Saccharin Sodium Concentration (g/l) | 2.0 |
| Pulse Current Density (mA/cm$^2$) | 9 to 19 |
| Duty Ratio of Pulse Current | 0.3 |

TABLE 2

| FeNiMo | | | | |
|---|---|---|---|---|
| Fe Mass % Ratio in Film | 0.65 | 0.70 | 0.74 | 0.75 |
| Fe Ion Concentration (g/l) | 2.1 | 2.4, 3.1 | 3.1 | 3.2, 3.3 |
| Ni Ion Concentration (g/l) | 10 | 10 | 10 | 10 |
| Fe Ion/Ni Ion | 0.21 | 0.24, 0.31 | 0.31 | 0.32, 0.33 |
| No Ion Concentration (g/l) | 0.03, 0.22, 0.25 | 0.12, 0.31 | 0.25 | 0.25, 0.27 |
| Boric Acid Concentration (g/l) | 25 | 25 | 25 | 25 |
| NaCl Concentration (g/l) | 25 | 25 | 25 | 25 |
| Saccharin Sodium Concentration (g/l) | 2.0 | 2.0 | 2.0 | 2.0 |
| Pulse Current Density (mA/cm$^2$) | 19 | 19, 13 | 19 | 19 |
| Duty Ratio of Pulse Current | 0.3 | 0.3 | 0.3 | 0.3 |

In this experiment, the plating bath temperature was set to 25 to 30° C. In addition, the pH of the plating bath was set to 3.0 to 4.0. A Ni electrode was used at the anode side. Furthermore, the duty ratio (ON/OFF) of a pulse current was set to 300/700 (msec/msec).

In this example, the FeNiMo alloy is formed by pulse current plating. The pulse current plating is performed, for example, by repeating ON and OFF of a current control device so as to allow current to flow intermittently in plating. As described above, since no current flows for a predetermined period of time at regular intervals, the FeNiMo alloy film is slowly formed by plating, and the deviation of current density distribution, which occurs in a related plating technique using a direct current, can be reduced. According to the pulse current plating, compared to direct current plating, the Fe content in the soft magnetic film can be easily controlled, and a large amount of Fe can be incorporated thereinto.

The concentration of Ni ions contained in a plating bath used for the manufacturing method of the soft magnetic film of the present invention is low, such as 10 g/l. Accordingly, the number of Ni ions in the plating bath brought into contact with the surface of a cathode (which is to be plated)

is relatively small in plating, and as a result, due to improvement of stirring effect, a large amount of Fe can be incorporated into the film. In addition, when the stirring effect is improved, the Fe ions are appropriately supplied, and hence a dense crystal can be formed.

As is the example of the present invention, when saccharin sodium ($C_6H_4CONNaSO_2$) is added to the plating bath for the FeNiMo alloy, since the saccharin sodium serves as a stress-relaxing agent, a film stress of the FeNiMo alloy formed by plating can be reduced.

In addition, when 2-butyne-1,4-diol is added to the plating solution for the FeNiMo alloy, growth of large and coarse crystal grains of the FeNiMo alloy can be suppressed, and the coercive force Hc can be decreased.

In addition, when 2-ethylhexyl sodium sulfate, which is a surfactant, is added to the plating bath for the FeNiMo alloy, hydrogen generated when the FeNiMo alloy is formed by plating can be removed, and hence the hydrogen is prevented from adhering to the plating film. When hydrogen adheres to the plating film, a dense crystal cannot be formed, and as a result, the surface is seriously roughened. Accordingly, when hydrogen is removed as in the case of the present invention, the surface roughness of the plating film can be decreased, and the coercive force Hc can be decreased.

Instead of the 2-ethylhexyl sodium sulfate described above, sodium lauryl sulfate may be used; however, the sodium lauryl sulfate is likely to generate bubbles when being added to a plating bath as compared to the 2-ethylhexyl sodium sulfate, and hence the sodium lauryl sulfate is difficult to use so as to effectively remove hydrogen. Accordingly, in the present invention, 2-ethylhexyl sodium sulfate, which is unlikely to generate bubbles as compared to the sodium lauryl sulfate described above, is preferably used so as to effectively remove hydrogen.

In addition, when added to the plating bath, boric acid serves as a pH buffer at the surface of an electrode and also effectively gives gloss to a plating film.

Next, the relationship of the composition ratio x of Fe and the composition b (mass percent) of Mo of the soft magnetic film with the resistivity $\rho$ and the saturated magnetic flux density Bs will be described. The soft magnetic film described above is represented by $(Fe_xNi_y)_aMo_b$ in which x+y=1 is satisfied when x and y are on a mass percent ratio basis and a+b=100 is satisfied when a an be are on a mass percent basis.

Figure 8:
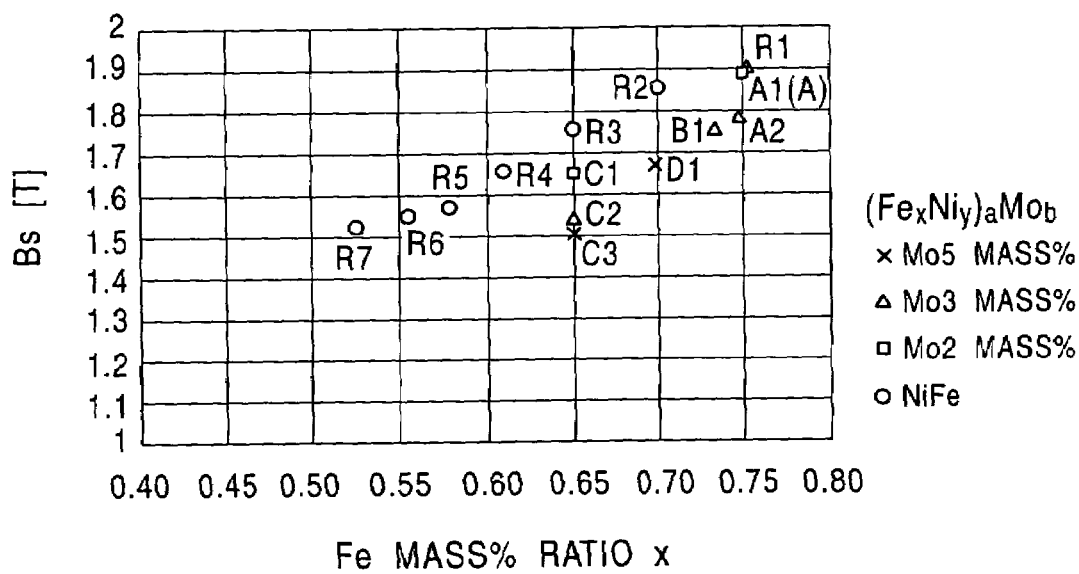
FIG. 8 is a graph showing the relationship of the saturated magnetic flux density Bs with the composition ratio x of Fe and the composition b (mass percent) of Mo of a soft magnetic film represented by $(Fe_xNi_y)_aMo_b$, in which x+y=1 is satisfied when x and y are on a mass percent ratio basis, and a+b=100 is satisfied when a and b are on a mass percent basis.
Figure 9:
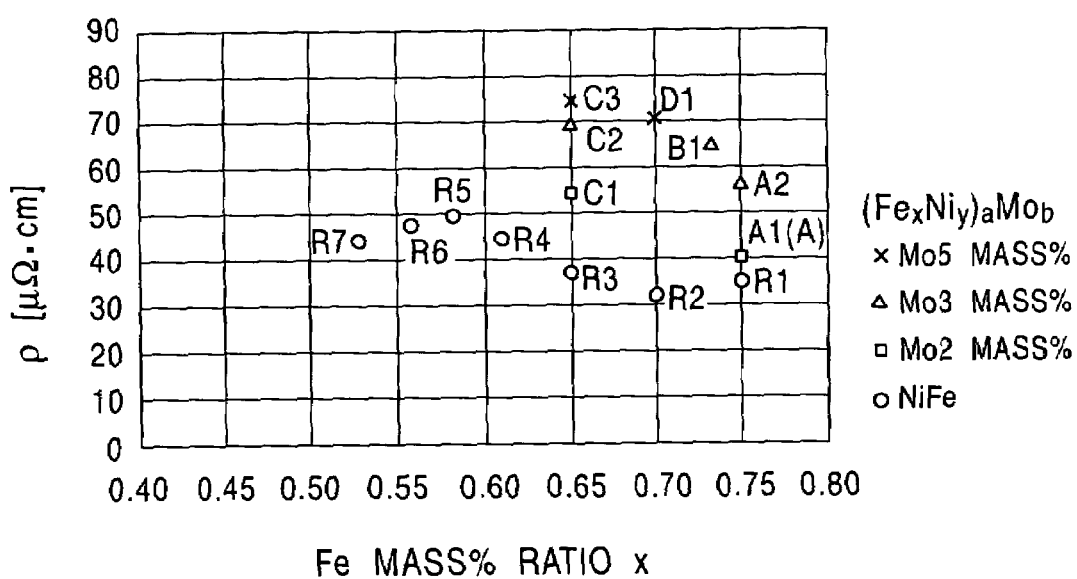
FIG. 9 is a graph showing the relationship of the resistivity with the composition ratio x of Fe and the composition b (mass percent) of Mo of a soft magnetic film represented by $(Fe_xNi_y)_aMo_b$, in which x+y=1 is satisfied when x and y are on a mass percent ratio basis, and a+b=100 is satisfied when a and b are on a mass percent basis.

FIGS. 8 and 9 are graphs each showing the relationship of the composition ratio x of Fe and the composition b (mass percent) of Mo of the soft magnetic film, which is represented by $(Fe_xNi_y)_aMo_b$, with the resistivity $\rho$ and the saturated magnetic flux density Bs. In the $(Fe_xNi_y)_aMo_b$, described above, x+y=1 is satisfied when x and y are on a mass percent ratio basis, and a+b=100 is satisfied when a and b are on a mass percent basis.

According to the graph shown in FIG. 8, when the composition ratio x of Fe to Ni of a $Ni_xFe_y$ alloy which contains no Mo, is increased, the saturated magnetic flux density Bs is increased (shown by O). According to the present invention, even when the composition ratio x of Fe to Ni is 0.65 or more, the saturated magnetic flux density is continuously increased. This trend is opposite to that of the soft magnetic film of the related technique disclosed in Japanese Unexamined Patent Application Publication No. 8-212512. As is the example of the present invention, when the concentration of Ni ions in a plating bath is set to 10 g/l, the ratio of concentration of Fe ions to that of Ni ions is set in the range of from 0.21 to 0.33, and pulse current plating is performed, although the composition ratio x of Fe to Ni is 0.65 or more, a magnetic film having a high saturated magnetic flux density can be formed by plating with high reproducibility.

According to the graph shown in FIG. 8, when the composition ratio x of Fe to Ni of the $(Fe_xNi_y)_aMo_b$ alloy is 0.65, and the Mo content b is 5 (mass percent) (shown by x), the saturated magnetic flux density Bs is 1.50 (T), which is 86% of a saturated magnetic flux density Bs of 1.75 (T) obtained from a $Ni_{35}Fe_{65}$ alloy which contains no Mo. According to the graph shown in FIG. 9, when the composition ratio x of Fe to Ni is 0.65, and the Mo content b (mass percent) is 5 (mass percent) (shown by x), the resistivity $\rho$ is 75 $\mu\Omega\cdot$cm, which is 202% of a resistivity of 37 $\mu\Omega\cdot$cm obtained from a $Ni_{35}Fe_{65}$ alloy which contains no Mo (shown by O).

According to the graphs shown in FIGS. 8 and 9, when the composition ratio x of Fe to Ni of the $(Fe_xNi_y)_aMo_b$ alloy is 0.65, and the Mo content b is 3 (mass percent) (shown by Δ), the saturated magnetic flux density Bs is 1.52 (T), and the resistivity $\rho$ is 70 $\mu\Omega\cdot$cm. In addition, when the composition ratio x of Fe to Ni of the $(Fe_xNi_y)_aMo_b$ alloy is 0.65, and the Mo content b (mass percent) is 2 (mass percent) (shown by □), the saturated magnetic flux density Bs is 1.65 (T), and the resistivity $\rho$ is 55 $\mu\Omega\cdot$cm.

According to the graph shown in FIG. 8, when the composition ratio x of Fe to Ni of the $(Fe_xNi_y)_aMo_b$ alloy is 0.70, and the Mo content b is 5 (mass percent) (shown by x), the saturated magnetic flux density Bs is 1.67 (T), which is 90% of a saturated magnetic flux density Bs of 1.87 (T) obtained from a $Ni_{30}Fe_{70}$ alloy which contains no Mo. In addition, according to the graph shown in FIG. 9, when the composition ratio x of Fe to Ni is 0.70, and the Mo content b is 5 (mass percent) (shown by x), the resistivity $\rho$ is 70 $\mu\Omega\cdot$cm, which is 225% of a resistivity of 31 $\mu\Omega\cdot$cm obtained from the $Ni_{30}Fe_{70}$ alloy which contains no Mo (shown by O).

According to the graph shown in FIG. 8, when the composition ratio x of Fe to Ni of the $(Fe_xNi_y)_aMo_b$ alloy is 0.75, and the Mo content b is 3 (mass percent) (shown by A), the saturated magnetic flux density Bs is 1.78 (T), which is 93% of a saturated magnetic flux density Bs of 1.90 (T) obtained from a $Ni_{25}Fe_{75}$ alloy which contains no Mo (shown by O). In addition, according to the graph shown in FIG. 9, when the composition ratio x of Fe to Ni is 0.75, and the Mo content b is 3 (mass percent) (shown by Δ), the resistivity $\rho$ is 57 $\mu\Omega\cdot$cm, which is 163% of a resistivity of 35 $\mu\Omega\cdot$cm obtained from the $Ni_{25}Fe_{75}$ alloy which contains no Mo (shown by O).

When the composition ratio x of Fe to Ni of the $(Fe_xNi_y)_aMo_b$ alloy is 0.75, and the Mo content b is 2 (mass percent) (shown by □), the saturated magnetic flux density Bs is 1.90 (T), which is equivalent to a saturated magnetic flux density Bs of 1.90 (T) obtained from the $Ni_{25}Fe_{75}$ alloy which contains no Mo (shown by O). In addition, according to the graph shown in FIG. 9, when the composition ratio x of Fe to Ni is 0.75, and the Mo content b is 2 (mass percent) (shown by □), the resistivity $\rho$ is 40 $\mu\Omega\cdot$cm, which is 114% of a resistivity of 35 $\mu\Omega\cdot$cm obtained from the $Ni_{25}Fe_{75}$ alloy which contains no Mo (shown by O).

As described above, when the Mo content of the $(Fe_xNi_y)_aMo_b$ alloy is increased, the resistivity is increased, and concomitant with this increase, the saturated magnetic flux density is decreased.

According to the results shown in FIGS. 8 and 9, it is understood that when the composition ratio x of Fe to Ni of the $(Fe_xNi_y)_aMo_b$ alloy is 0.65, and Mo in the range of from 2 to 5 mass percent is added, a resistivity ρ in the range of from 55 to 75 μΩ·cm can be obtained. In the present invention, even when the $(Fe_xNi_y)_aMo_b$ alloy has a resistivity ρ in the range of from 55 to 75 μΩ·cm, a saturated magnetic flux density of 1.50 (T) or more can be obtained.

In addition, it is understood that when the composition ratio x of Fe to Ni of the $(Fe_xNi_y)_aMo_b$ alloy is 0.70, and Mo in the range of from 2 to 5 mass percent is added, a resistivity ρ in the range of from 45 to 70 μΩ·cm can be obtained. In the present invention, even when the $(Fe_xNi_y)_aMo_b$ alloy has a resistivity ρ in the range of from 45 to 70 μΩ·cm, a saturated magnetic flux density of 1.67 (T) or more can be obtained.

Furthermore, it is understood that when the composition ratio x of Fe to Ni of the $(Fe_xNi_y)_aMo_b$ alloy is 0.75, and Mo in the range of from 2 to 3 mass percent is added, a resistivity ρ in the range of from 40 to 57 μΩ·cm can be obtained. In the present invention, even when the $(Fe_xNi_y)_aMo_b$ alloy has a resistivity ρ in the range of from 40 to 57 μΩ·cm, a saturated magnetic flux density in the range of from 1.78 to 1.90 (T) can be obtained.

Next, the saturated magnetic flux density Bs, the resistivity ρ, and the coercive force Hc were measured when the Mo content (mass percent) of a soft magnetic film formed of an $(Fe_xNi_y)_aMo_b$ alloy was changed. The results are shown in FIGS. 10 to 12.

Figure 10:
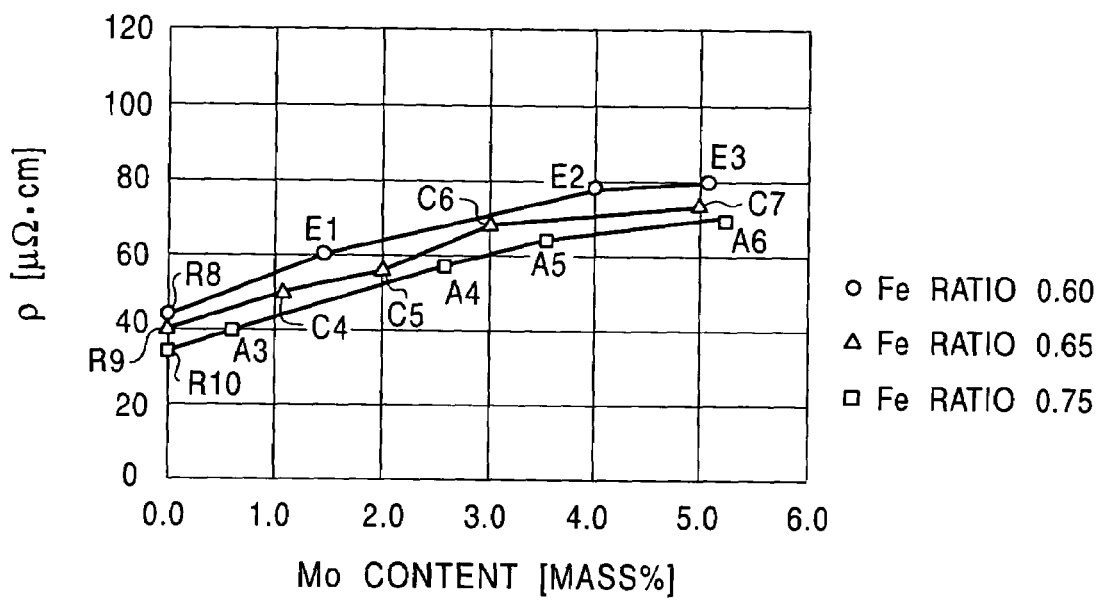
FIG. 10 is a graph showing the resistivity which is obtained by changing the Mo content when the composition ratios x of Fe to Ni in an $(Fe_xNi_y)_aMo_b$ alloy are 0.60 (comparative example), 0.65, and 0.75 (examples)
Figure 11:
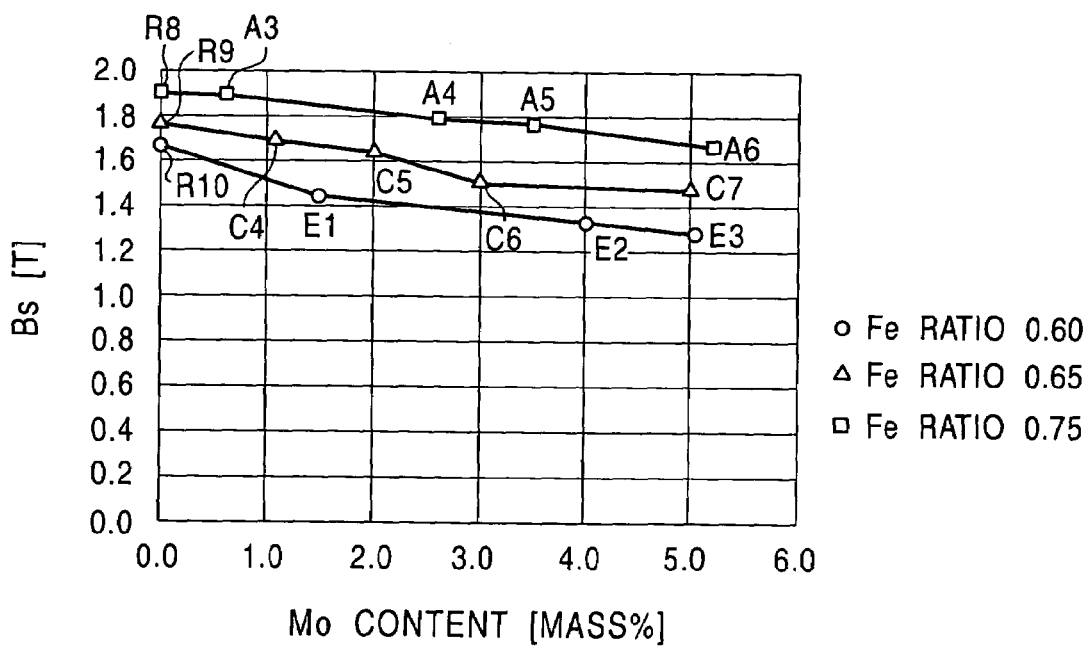
FIG. 11 is a graph showing the saturated magnetic flux density which is obtained by changing the Mo content when the composition ratios x of Fe to Ni in an $(Fe_xNi_y)_aMo_b$ alloy are 0.60 (comparative example), 0.65, and 0.75 (examples)
Figure 12:
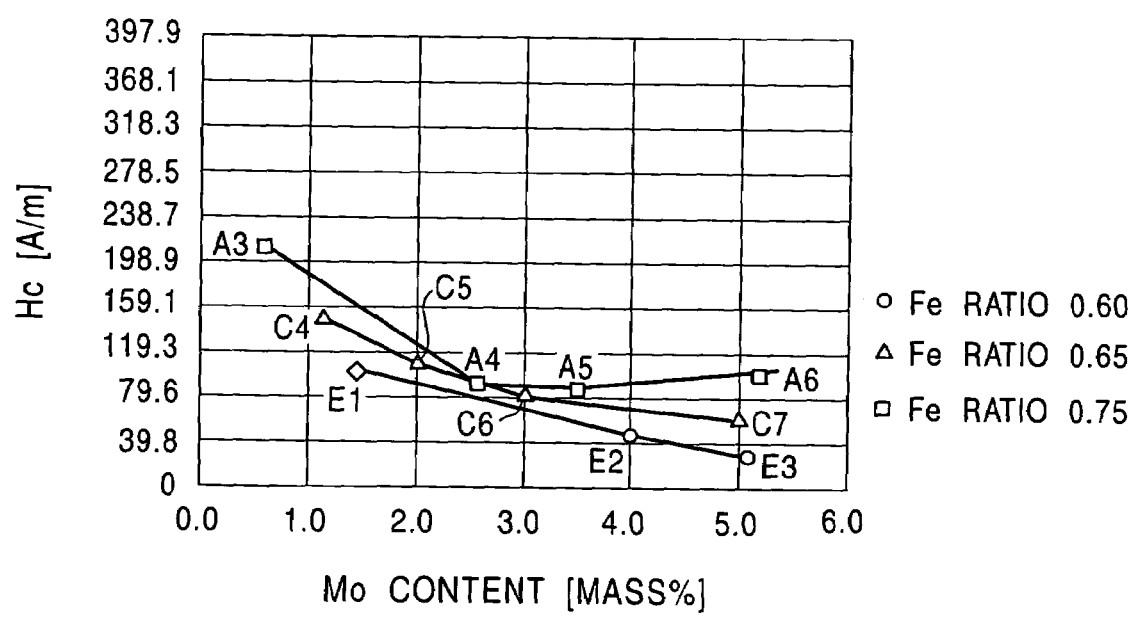
FIG. 12 is a graph showing the coercive force which is obtained by changing the Mo content when the composition ratios x of Fe to Ni in an $(Fe_xNi_y)_aMo_b$ alloy are 0.60 (comparative example), 0.65, and 0.75 (examples)

In FIGS. 10 to 12, the saturated magnetic flux density Bs, the resistivity ρ, and the coercive force Hc are shown which are obtained when the Mo content of each of the $(Fe_xNi_y)_aMo_b$ alloys is changed at composition ratios x of Fe to Ni of 0.60 (comparative example), 0.65, and 0.75 (examples).

The composition of a plating solution is shown in Table 3.

TABLE 3

| FeNiMo | | | |
|---|---|---|---|
| Fe Mass % Ratio of Film | 0.60 | 0.65 | 0.75 |
| Fe Ion Concentration (g/l) | 1.3, 3.1 | 2.1, 3.1 | 3.1, 3.3 |
| Ni Ion Concentration (g/l) | 10 | 10 | 10 |
| Fe Ion/Ni Ion | 0.13, 0.31 | 0.21, 0.31 | 0.31, 0.33 |
| Mo Ion Concentration (g/l) | 0 to 0.24 | 0 to 0.25 | 0.25, 0.27 |
| Boric Acid Concentration (g/l) | 25 | 25 | 25 |
| NaCl Concentration (g/l) | 25 | 25 | 25 |
| Saccharin Sodium Concentration (g/l) | 2.0 | 2.0 | 2.0 |
| Pulse Current Density (mA/cm$^2$) | 19, 9 | 19 | 19, 13 |
| Duty Ratio of Pulse Current | 0.3 | 0.3 | 0.3 |

In the experiment, the plating bath temperature was set to 25 to 30° C. In addition, the pH of the plating bath was set to 3.0 to 4.0. A Ni electrode was used at the anode side. Furthermore, the duty ratio (ON/OFF) of a pulse current was set to 300/700 (msec/msec).

From the graph shown in FIG. 10, it is understood that when the Mo content is increased, the resistivity ρ is also monotonously increased in all the cases in which the composition ratios x of Fe to Ni of the $(Fe_xNi_y)_aMo_b$ alloy are 0.60 (comparative example), 0.65, and 0.75 (example).

In the case in which the composition ratio x of Fe to Ni is 0.65, when the Mo content is more than 1.0 (mass percent), the resistivity ρ is more than 47 μΩ·cm, and when the Mo content is more than 2.0 (mass percent), the resistivity ρ is more than 55 μΩ·cm. In addition, when the Mo content is more than 3.0 (mass percent), the resistivity ρ is more than 70 μΩ·cm, and when the Mo content is 5.0 (mass percent), the resistivity ρ is 75 μΩ·cm.

In the case in which the composition ratio x of Fe to Ni is 0.75, when the Mo content is more than 0.6 (mass percent), the resistivity ρ is more than 40 μΩ·cm, and when the Mo content is more than 2.8 (mass percent), the resistivity β is more than 60 μΩ·cm. In addition, when the composition ratio x of Fe to Ni is 0.75, the rate of increase in resistivity ρ (slope of the graph) is constant (8.3 μΩ·cm/Mo mass percent) from a Mo content of zero to 3.5 (mass percent) and is decreased (4.1 μΩ·cm/Mo mass percent) when the Mo content is more than 3.5 (mass percent).

When the composition ratio x of Fe to Ni is 0.60, the rate of increase in resistivity ρ thereof is similar to that of each of the cases in which the composition ratios are 0.65 and 0.75. However, when the composition ratio x of Fe to Ni is 0.60, the absolute value of the resistivity ρ thereof is large as compared to those of the cases described above.

Next, from the graph shown in FIG. 11, it is understood that, in all the cases in which the composition ratios x of Fe to Ni of the $(Fe_xNi_y)_aMo_b$ alloy are 0.60 (comparative example), 0.65, and 0.75 (examples), the saturated magnetic flux density Bs is decreased as the Mo content is increased.

In the case in which the composition ratio x of Fe to Ni is 0.65, when the Mo content is 1.0 (mass percent) or less, the saturated magnetic flux density Bs is 1.7 (T) or more, and when the Mo content is 2.0 (mass percent) or less, the saturated magnetic flux density Bs is 1.65 or more. In addition, when the Mo content is 3.0 (mass percent) or less, the saturated magnetic flux density Bs is 1.52 or more, and when the Mo content is 5.0 (mass percent) or less, the saturated magnetic flux density Bs is 1.50 or more.

In the case in which the composition ratio x of Fe to Ni is 0.75, when the Mo content is 0.6 (mass percent) or less, the saturated magnetic flux density Bs is 1.9 (T) or more, and when the Mo content is 2.8 (mass percent) or less, the saturated magnetic flux density Bs is 1.78 or more. In addition, when the Mo content is 2.6 (mass percent) or less, the saturated magnetic flux density Bs is 1.8 (T) or more, and when the Mo content is 4.5 (mass percent) or less, the saturated magnetic flux density Bs is 1.7 (T) or more.

When the composition ratio x of Fe to Ni is 0.60, the absolute value of the saturated magnetic flux density is always small as compared to the case in which the composition ratio x is 0.75. In addition, when the composition ratio x is 0.60, the saturated magnetic flux density is decreased to less than 1.5 (T) as the Mo content is increased to more than 1.0 mass percent. Furthermore, when the composition ratio x is 0.60, compared to the case in which the composition ratio x is 0.75, the rate of decrease in saturated magnetic flux density is large when the Mo content is increased.

From the graph shown in FIG. 12, it is understood that when the Mo content of the $(Fe_xNi_y)_aMo_b$ alloy is increased, the coercive force Hc is decreased, and the soft magnetic properties are improved. In the case in which the composition ratio x of Fe to Ni is 0.75, a coercive force Hc of 96 A/m or less can be obtained when the Mo content is in the range of from 2.5 to 5.0 mass percent. In addition, when the composition ratio x of Fe to Ni is 0.65, the coercive force can be further decreases as compared to the case in which the composition ratio x is 0.75.

Figure 13:
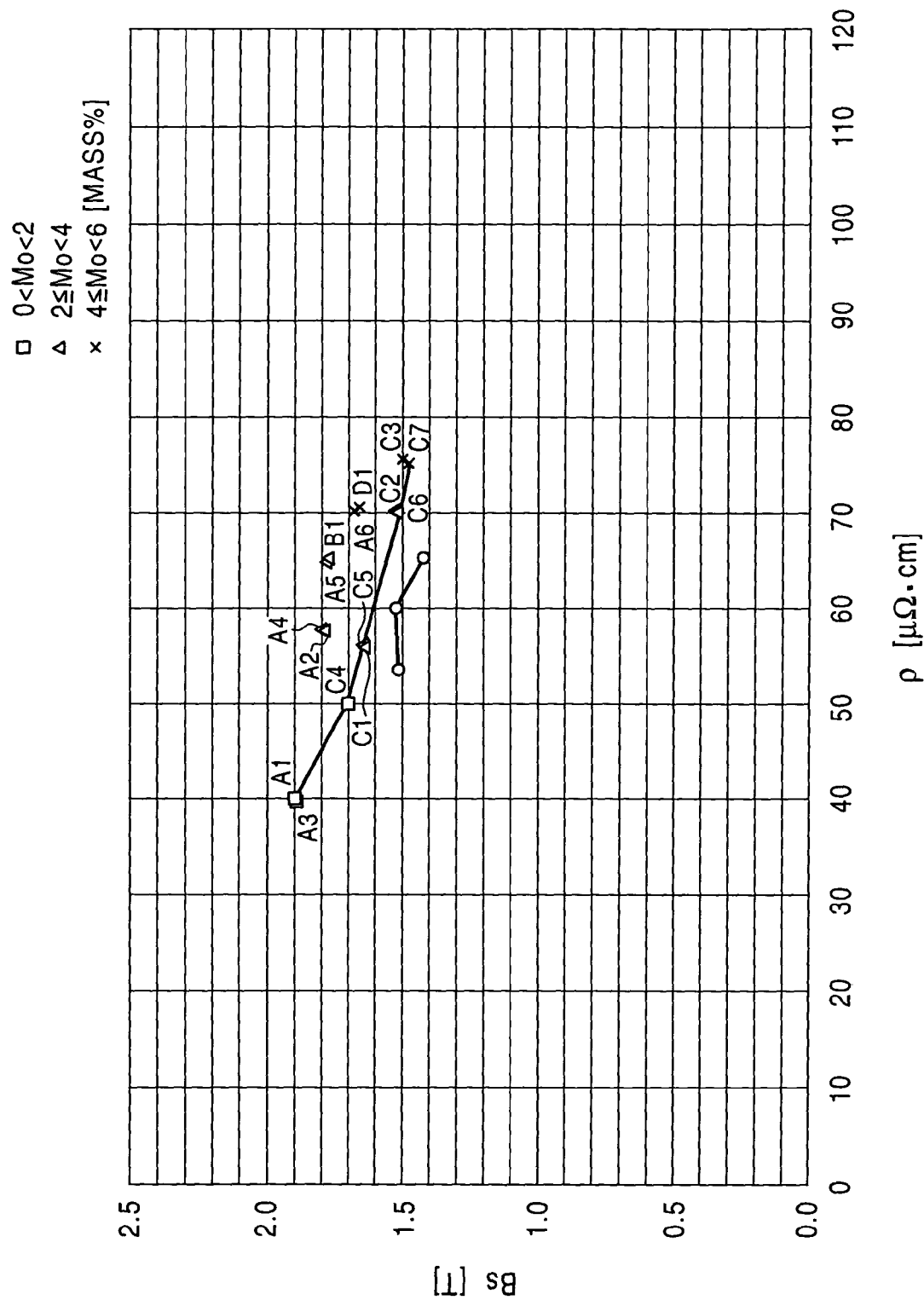
FIG. 13 is a graph showing the relationship between the resistivity ρ and the saturated magnetic flux density Bs of FeNiMo alloys obtained in the present invention, in which the transverse axis represents the resistivity ρ and the vertical axis represents the saturated magnetic flux density Bs.

FIG. 13 is a graph showing the relationship between the resistivity ρ and the saturated magnetic flux density Bs of the FeNiMo alloys shown in FIGS. 8 to 12, in which the transverse axis represents the resistivity ρ and the vertical axis represents the saturated magnetic flux density Bs.

The points plotted in FIGS. 8 to 12 have reference labels each consists of an alphabetical character and a numeral, and the points plotted in FIG. 13 having the same reference labels as those in FIGS. 8 to 12 are the same data as those shown in FIGS. 8 to 12.

The properties required for a magnetic material for forming a thin film magnetic head which has superior high frequency performance and which can meet the trend toward higher recording density are a high saturated magnetic flux density Bs and a high resistivity ρ. That is, in FIG. 13, when the point of a magnetic material is plotted at the top and right side in the figure, the material is regarded as a preferable material.

However, in general, the resistivity ρ of a magnetic material is decreased as the saturated magnetic flux density Bs is increased, and the saturated magnetic flux density Bs of a magnetic material is decreased as the resistivity ρ is increased.

As can be seen from the graph shown in FIG. 13, according to the present invention, even when the saturated magnetic flux density Bs is 1.90 (T), a resistivity ρ of 40 μΩ·cm can be obtained (point A1 in the figure), and even when the resistivity is 75 μΩ·cm, a saturated magnetic flux density Bs of 1.50 (T) can be obtained (point C7 in the figure).

In addition, points plotted on the graph showing the relationship between the resistivity ρ and the saturated magnetic flux density Bs of the FeNiMo alloys are all located above the line formed by connecting points A1, C4, C1, C5, C2, C6, C3, and C7 in the figure. In addition, on the graph, in which the transverse axis represents the resistivity ρ (μΩ·cm) and the vertical axis represents the saturated magnetic flux density Bs (T), C4 is at the coordinates (50, 1.7), C1 is at the coordinates (55, 1.65), C5 is at the coordinates (55, 1.65), C2 is at the coordinates (70, 1.52), C6 is at the coordinates (70, 1.52), and C3 is at the coordinates (75, 1.50).

On the graph shown in FIG. 13, the resistivity ρ and the saturated magnetic flux density Bs of the FeNiMo alloy shown in FIG. 17 of Japanese Unexamined Patent Application Publication No. 8-212512, which is disclosed as patent publication 1 in Information Disclosure Statement, are also plotted by O. As shown on the graph shown in FIG. 13, the points thus plotted of the ρ and the Bs of the FeNiMo alloy disclosed in the patent publication 1 are all located below those of the FeNiMo alloy of the present invention.

As has thus been described, an FeNiMo alloy can be provided having both a higher saturated magnetic flux density Bs and a higher resistivity ρ than those in the past.

According to the present invention described above in detail, a soft magnetic film can be provided which is represented by $(Fe_xNi_y)_aMo_b$, in which $0.65 \leq x \leq 0.75$ and $x+y=1$ are satisfied when x and y are on a mass percent ratio basis, and $0<b\leq 5$ and $a+b=100$ are satisfied when a and b are on a mass percent basis.

The soft magnetic film of the present invention is a soft magnetic film which is composed of a stable FeNiMo alloy having a large composition ratio x of Fe as compared to that in the past.

In addition, in the soft magnetic film of the present invention, since Mo is contained at the composition ratio described above, the resistivity is increased.

In particular, the resistivity of the soft magnetic film can be 40 μΩ·cm or more.

In addition, the soft magnetic film according to the present invention is composed of an FeNiMo alloy, in which the mass percent x of Fe to Ni is 0.65 or more, and preferably 0.70 or more. Although the Fe content is high as described above, a high saturated magnetic flux density Bs of 1.50 (T) or more, 1.67 (T) or more, 1.78 (T) or more, or 1.90 (T) or more can be stably obtained. Accordingly, an FeNiMo alloy having both a high saturated magnetic flux density Bs and a high resistivity ρ can be easily provided.

In addition, according to the present invention, since the plating bath composition is appropriately controlled, and pulse current plating is performed, the soft magnetic film described above can be formed by plating with high reproducibility.

As described above, when the soft magnetic film composed of the FeNiMo alloy of the present invention is used for a core layer or a magnetic layer of a thin film magnetic head, a thin film magnetic head can be manufactured which can meet the trend toward higher recording density and higher frequency performance.

What is claimed is:

1. A plated soft magnetic film comprising Fe, Ni, and Mo, and which is represented by the formula $(Fe_xNi_y)_aMo_b$, wherein $0.65 \leq x \leq 0.75$ and $x+y=1$ are satisfied when x and y are on a mass percent ratio basis, and $0<b\leq 5$ and $a+b=100$ are satisfied when a and b are on a mass percent basis, and further comprising a coercive force of 96 A/m or less.

2. A soft magnetic film according to claim 1, wherein the resistivity of the soft magnetic film is 40 μΩ·cm or more.

3. The soft magnetic film according to claim 1, wherein the mass percent ratio x of Fe is 0.65 or more, and the resistivity of the soft magnetic film is 55 μΩ·cm or more.

4. The soft magnetic film according to claim 3, wherein the mass percent ratio x of Fe is 0.65 or more, and the resistivity of the soft magnetic film is 70 μΩ·cm or more.

5. The soft magnetic film according to claim 1, wherein the saturated magnetic flux density Bs is 1.50 T or more.

6. The soft magnetic film according to claim 5, wherein the saturated magnetic flux density Bs is 1.67 T or more.

7. The soft magnetic film according to claim 6, wherein the saturated magnetic flux density Bs is 1.78 T or more.

8. The soft magnetic film according to claim 7, wherein the saturated magnetic flux density Bs is 1.90 T or more.

* * * * *